United States Patent
Gajic et al.

(10) Patent No.: US 7,710,698 B2
(45) Date of Patent: May 4, 2010

(54) DISTANCE PROTECTION RELAY AND METHOD

(75) Inventors: Zoran Gajic, Västerås (SE); Torbjörn Einarsson, Sala (SE); Sethuraman Ganesan, Bangalaore (IN)

(73) Assignee: ABB Technology Ltd., Zürich (CH)

( * ) Notice: Subject to any disclaimer, the term of this patent is extended or adjusted under 35 U.S.C. 154(b) by 493 days.

(21) Appl. No.: 11/819,862

(22) Filed: Jun. 29, 2007

(65) Prior Publication Data
US 2008/0036559 A1 Feb. 14, 2008

(30) Foreign Application Priority Data
Jun. 29, 2006 (EP) .................... 06445057

(51) Int. Cl.
*H02H 7/00* (2006.01)
(52) U.S. Cl. ........................................ 361/62
(58) Field of Classification Search ............. 361/62
See application file for complete search history.

(56) References Cited

U.S. PATENT DOCUMENTS 4,591,992 A * 5/1986 Yamaura .................. 702/59
4,698,718 A * 10/1987 Chow et al. ............... 361/77
7,053,503 B2 * 5/2006 Tange et al. .............. 307/51

FOREIGN PATENT DOCUMENTS

| EP | 1223652 A | 7/2002 |
| JP | 02164225 A | 6/1990 |
| WO | WO-01/78209 A | 10/2001 |
| WO | WO-03/044547 A | 5/2003 |

OTHER PUBLICATIONS

European Search Report—Nov. 27, 2006.
* cited by examiner

*Primary Examiner*—Stephen W Jackson
(74) *Attorney, Agent, or Firm*—Venable LLP; Eric J. Franklin

(57) ABSTRACT

A protective relay for an electrical power distribution system and a method. The protective relay includes first and second current transformers arranged to sense a respective current flowing into a power line, and a voltage sensing device arranged to sense the voltage of the power line. The protective relay further includes a first and a second device for determining the direction of a fault within the system based on a current signal from the first and second current transformers and a voltage signal from the voltage sensing means. The protective relay further includes a third device for determining the fault direction based on a sum of the current signals from the first and second current transformers and a voltage signal from said voltage sensing means. A controller determines whether a fault is internal or external based on the fault directions determined by the first, second and third devices.

18 Claims, 2 Drawing Sheets

DISTANCE PROTECTION RELAY AND METHOD

CROSS-REFERENCE TO RELATED APPLICATIONS

This application claims priority to European patent application 06445057 filed 29 Jun. 2006.

FIELD OF THE INVENTION

The present invention relates to the field of electrical power distribution systems and in particular to protective relays within such systems. The invention is also related to a corresponding method.

BACKGROUND OF THE INVENTION

An electrical power distribution system comprises distance protection systems arranged to protect, monitor and control the functioning of devices forming part of the power distribution system. The protection systems prevent, among other things, short-circuits, over-currents and over-voltages in power lines of the power distribution system.

Protective relays are used throughout the electrical power distribution system for providing such protection and control. The protective relays detect and isolate faults on transmission and distribution lines by opening and closing circuit breakers, and they are operated through current transformers (CT) arranged to sense a fault current and act accordingly. Briefly, a fault direction can be determined based on observations of the voltage and current conditions in the power distribution system. The current and voltage waveforms are analyzed in order to determine the impedance. If the impedance is above or below a certain value, it can be established whether a fault is present or not. Further, the direction of the fault may also be determined, for example by determining the angle between the phase of the voltage and the phase of the current.

In a breaker-and-a-half system the current signals from two sets of current transformers are summed to obtain the current that is going out on a power line. If there is an external fault present with high currents through the two current transformers, then one of them might saturate. Depending on which one of the current transformers gets saturated, a wrong directional decision can be made by the protective relay.

Further, when a current transformer saturates its inductance drops and there is then a risk to harm other load devices, besides the above-mentioned risk of making incorrect directional decisions. Care has to be taken to avoid such core saturation and the current transformer specifications should be adequately chosen in dependence on their intended use.

Presently such saturation problems are ignored. There are thus no fault direction detection algorithms and devices for combating saturation of current transformers.

In view of the above, it would be desirable to provide an improved protective relay for handling saturation of the current transformers. Further, it would also be desirable to provide a corresponding method.

SUMMARY OF THE INVENTION

It is an object of the present invention to provide an improved protective relay with improved means for preventing problems related to saturation of current transformers, thereby overcoming or at least alleviating the above-mentioned drawbacks of the prior art.

It is another object of the present invention to provide an improved protective relay that is capable of handling saturation of current transformers. In particular, it is an object of the present invention to provide a protective relay by means of which a correct fault direction can be provided even in case a current transformer gets saturated.

It is yet another object of the present invention to increase the reliability of a protective relay within a power distribution system. In particular, it is an object of the present invention to increase the reliability of results obtained on fault direction.

These objects, among others, are achieved by a protective relay and by a method.

In accordance with the invention a protective relay for an electrical power distribution system is provided. The power distribution system comprises one or more power lines. The protective relay comprises a first and a second current transformer arranged to sense a respective current flowing into a power line. Further, a voltage sensing device is arranged to sense the voltage of the power line. The protective device is characterized by a first device for determining the direction of a fault within the system based on a current signal from the first current transformer and a voltage signal from said voltage sensing means; a second device for determining the direction of a fault within the system based on a current signal from the second current transformer and a voltage signal from the voltage sensing means; a third device for determining the direction of a fault within the system based on a sum of the current signals from the first and second current transformers and a voltage signal from the voltage sensing means; and controller means for determining whether a fault is internal or external based on the fault directions determined by the first, second and third devices. By means of the present invention problems due to saturation of current transformers are overcome. The inventive protective relay is able to handle even cases in which one of the current transformers indeed gets saturated. An improved fault direction determination is provided, thereby increasing the reliability of an electrical power distribution system. A fault direction can be determined with higher certainty and the fault can be located faster, thereby facilitating servicing and lowering the duration of a power failure.

In accordance with an embodiment of the invention, if one or more of the first, second and third devices indicate an external fault, then the fault is determined to be an external fault. By means of this, an increased reliability of a determined fault direction is provided.

In accordance with an embodiment of the invention, means for setting a current level is included, wherein the first and second devices are arranged to be disregarded if the current signal in the respective device is below the set current level. The current level is preferably set below a current level at which there is a risk of saturation of one of the current transformers. Further, the current level is preferably set to be higher than the maximum load current of the system. Again, this provides an increased security against problems caused by saturation of current transformers.

In accordance with an embodiment of the invention, the first, second and third devices are directional elements. Devices that are easily available on the market can thus be utilized, whereby implementation of the present invention is facilitated and costs lowered.

In accordance with an embodiment of the invention, the protective relay further comprises a number of circuit breakers. The protective relay then preferably comprises means for tripping a circuit breaker in response to a determined fault. An improved security that a decision to trip a circuit breaker is correct is thereby provided.

The invention also comprises such method, whereby advantages corresponding to the above are achieved.

Further characteristics, advantages and objects of the invention will become apparent when reading the following detailed description.

DETAILED DESCRIPTION OF PREFERRED EMBODIMENTS

Generally, a protective relay is arranged to protect a certain part of an electrical power distribution system. In this context an external fault is a fault occurring outside the protection zone of a specific protective relay, whereas an internal fault is a fault occurring within its protection zone. The direction of a fault may then be indicated as an external fault or an internal fault depending on the established direction of the fault. Upstreams is generally defined as being the source side (e.g a substation) of the circuit breaker, and downstreams or forward as being on the load side of the circuit breaker.

Figure 1:
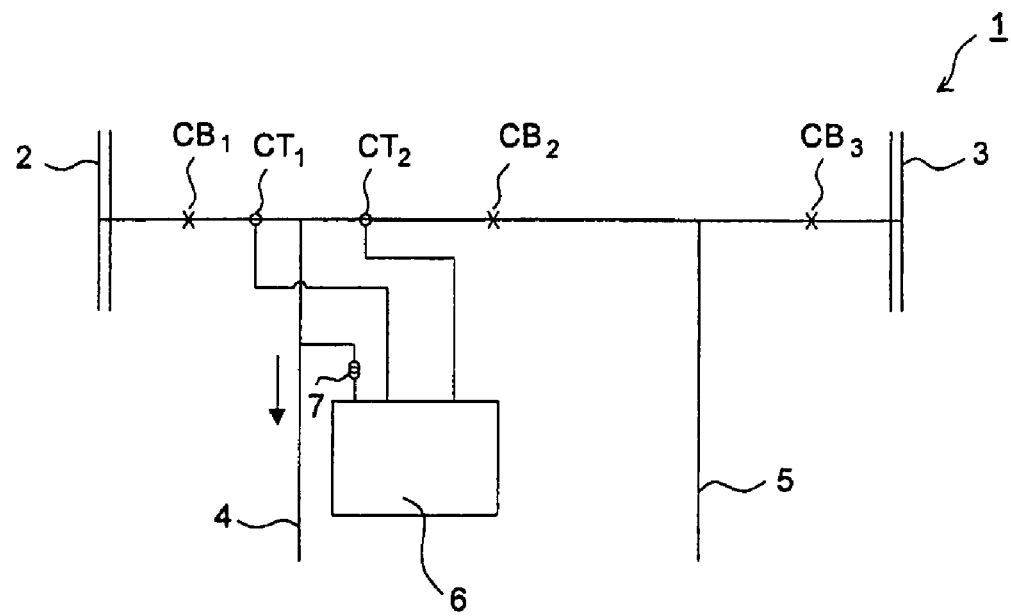
FIG. 1 illustrates schematically a typical power distribution system in which the present invention may be implemented.

FIG. 1 illustrates schematically a typical power transmission system comprising a protective relay and in which the present invention can advantageously be implemented. The illustrated part of a power transmission system 1 is shown to comprise a first and a second busbar 2, 3 and one or more power lines 4, 5. In the figure, only two power lines are indicated; however, it is realized that there could be any number of power lines. Further, it is realized that a bus may comprise any suitable number of busbars, for example three busbars. The power lines 4, 5 are fed from two directions, i.e. from the two busbars and current sensing means such as current transformers are arranged to sense the current on each respective feeder line, whereby the current going out on the power line 4, 5 is obtained by summing up the current from the two current transformers.

A protective relay 6 is arranged to sense faults and initiate a disconnection order, also known as initiating a trip. In order for the protective relay to detect faults, the system 1 comprises the above-mentioned means for sensing current, which means typically comprises current transformers $CT_1$, $CT_2$. The current transformers $CT_1$, $CT_2$ are arranged to provide a signal that is proportional to the current $I_{Load}$ flowing into the power lines 4, 5. Further, means 7 for sensing the voltage on the power lines 4, 5 is also provided, typically a voltage transformer for stepping down the high voltages of the electrical power system into convenient levels for the relay 6 to handle. The system 1 also comprises a number of circuit breakers $CB_1$, $CB_2$ and $CB_3$ arranged to open or close the power transmission system 1 based on the commands received from the protective relay 6.

The protective relay 6 further comprises control circuitry for determining whether a fault is internal or external, and commands the various circuit breakers $CB_1$, $CB_2$, $CB_3$ to open accordingly.

Figure 2:
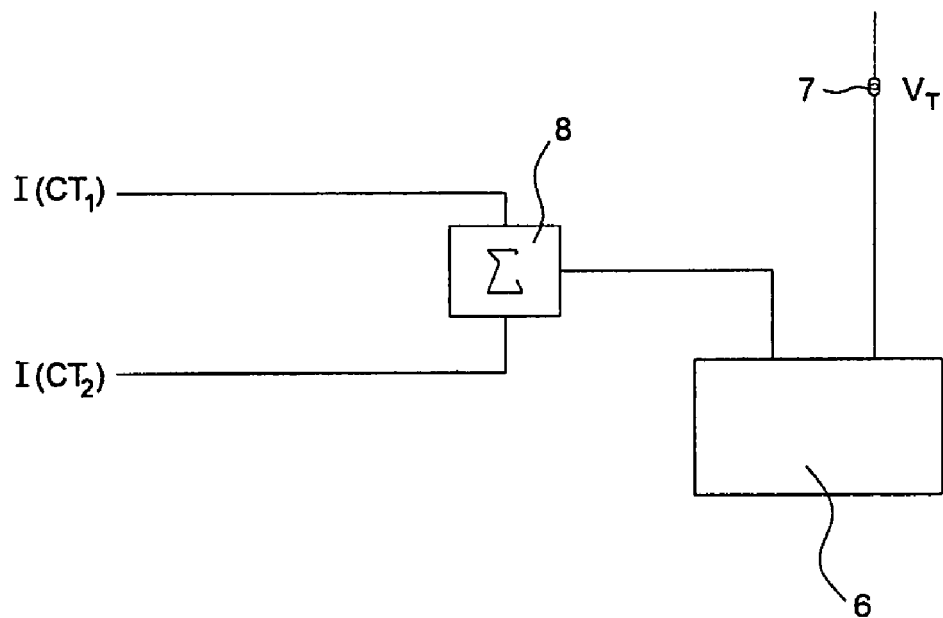
FIG. 2 illustrates schematically a prior art way of determining the presence of a fault within the power system.

In order to obtain a thorough understanding of the present invention, a known way of determining a fault direction is described briefly with reference to FIG. 2. In a multi-breaker arrangement such as, for example, a ring bus arrangement or a breaker-and-a-half arrangement, the current signals $I(CT_1)$, $I(CT_2)$ from two sets of current transformers $CT_1$, $CT_2$ are summed in an adder 8 in order to obtain a current signal proportional to the current on the power line. This signal is provided to the protective relay 6, as is the voltage on the power line by means of a voltage sensing means, such as a voltage transformer 7. A fault may then be detected by determining the impedance. This can for example be accomplished by comparing current samples from a previous power cycle to current samples from a present cycle and determining the sign of the difference between the samples. Thereafter the sign of the voltage is compared to the sign of the current and an indication of the fault direction can then be determined. However, as explained in the introductory part of the description, one of the current transformers $CT_1$, $CT_2$ might get saturated, which in turn may result in an incorrect directional decision being made.

Figure 3:
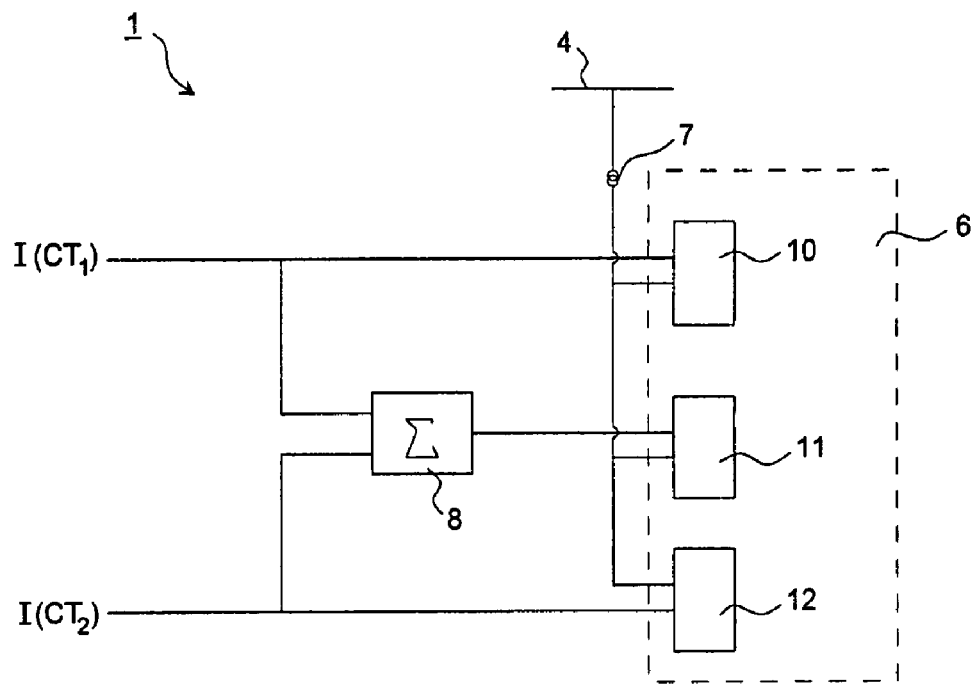
FIG. 3 illustrates schematically an embodiment of the present invention.

FIG. 3 illustrates schematically an embodiment of the present invention. Same reference numerals as used in connection with FIGS. 1 and 2 are used also in FIG. 3 when applicable.

The currents from the first and second current transformers $CT_1$, $CT_2$ are summed up in an adder 8, as in the prior art. The summed current and a voltage signal representative of the voltage on the power line is provided to a directional element 11. The direction of a fault may then be determined in a conventional manner.

In accordance with the invention, the direction of a fault is also determined by determining separately the direction of the respective currents $I(CT_1)$, $I(CT_2)$ through each current transformer $CT_1$ and $CT_2$ of the protective relay 6. That is, the current signals $I(CT_1)$ and $I(CT_2)$ are also provided to directional element 10 and 12, respectively. The voltage signal VT indicative of the voltage on the power line is also provided to both directional elements 10 and 12, and a respective fault direction is determined.

In an embodiment of the invention, if one of the current transformers $CT_1$ or $CT_2$ indicates an external fault by means of their respective directional elements 10, 12, then the fault is considered to be external. For a fault to be considered to be internal, all three devices 10, 11 and 12 have to indicate that the fault is indeed internal, else the fault is deemed as being external.

However, while the above described solution works well in most cases, such solution may cause problems at high resistance faults. At high resistance faults with high through load from a first busbar to a power line or to a second busbar, the direction of the current for one of the current transformers CT1 or $CT_2$ might actually be opposite that on the power line.

In order to overcome such scenario, and in accordance with another embodiment of the invention, a current level $I_{setting}$ is introduced below which the output signals from devices 10 and 12 are disregarded. Only the output signal from device 11, i.e. the direction of the summated currents is used in determining the existence and direction of a fault.

The current level $I_{setting}$ is chosen to be above the maximum load current of the system 1. It should also preferably be set to be below the current at which there is a risk for saturation.

Figure 4:
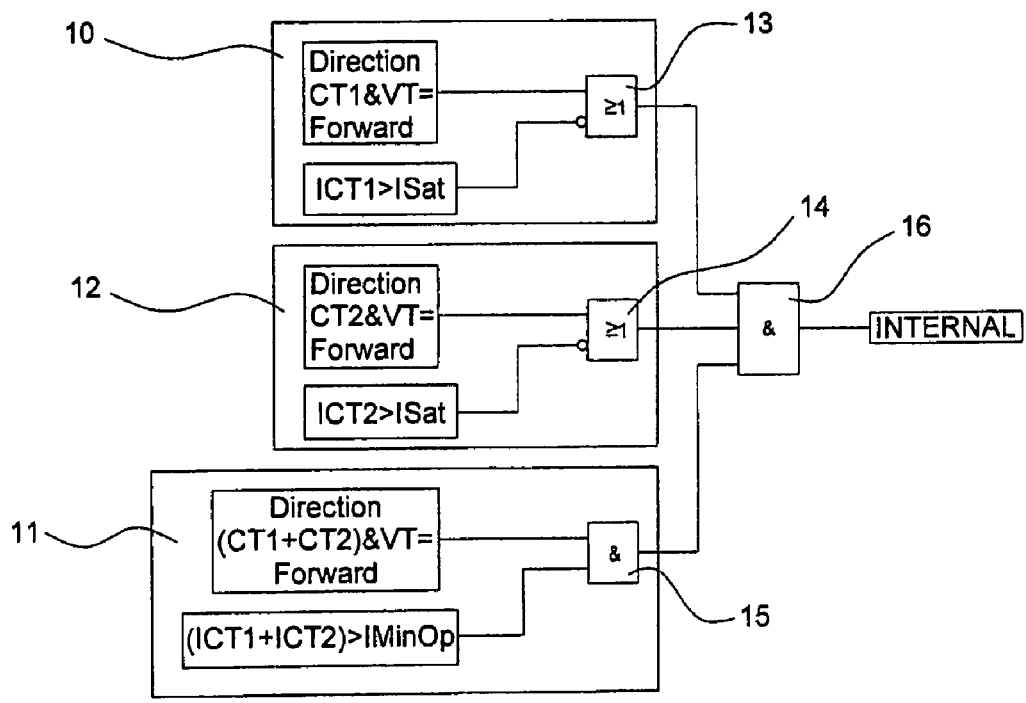
FIG. 4 is another illustration of the embodiment shown in FIG. 3.

The above description of the operation of the inventive protection arrangement is summarized in FIG. 4 in a preferred embodiment. The first device 10 determines the fault direction based on the current signal from the first current transformer $CT_1$ and a voltage signal representative of the voltage on a power line. If the fault direction is indicated as being internal and if the current signal is below a set value, then the first device 10 indicates an internal fault. These requirements are illustrated by the complemented input logic gate 13. The current value should be set so as to minimize the risk of the current transformers to saturate, as explained earlier.

Similarly, the second device 12 determines the fault direction based on the current signal from the second current transformer $CT_2$ and a voltage signal representative of the voltage on a power line. If the fault direction is indicated as being internal and if the current signal is below a set value, then the second device 12 indicates an internal fault. These requirements are illustrated by the complemented input logic gate 14.

Finally, the third device 11 is arranged to determine the fault direction based on the sum of the separate current signals from each of the respective current transformers $CT_1$, $CT_2$. The sum of the current signals $I(CT_1)+I(CT_2)$ should be above a minimum operation current level $I_{MinOp}$. If both these requirements are fulfilled (as illustrated by a AND-gate 15), then the third device 11 indicates an internal fault.

If all three devices 10, 11, 12 indicate an internal fault, then the fault is determined to be internal. This is illustrated in the figure by the AND-gate 16.

In the preferred embodiment, the fault direction determining devices 10 and 12 are thus utilized only if the current signals $I(CT_1)$ and $I(CT_2)$ of the respective current transformers $CT_1$ and $CT_2$ comply with a set current level, as mentioned earlier. In the figure this set current level is indicated as being a saturation current $I_{Sat}$. Further, in the preferred embodiment, the fault direction determining device 11 should have a total current $I(CT_1)+I(CT_2)$ that is larger than a minimum operation current $I_{MinOp}$. This operation current $I_{MinOp}$ can be chosen in a conventional manner, for example depending on noise levels, as is well known within the field. If one or more of the fault direction determining devices 10, 11 or 12 indicate an external fault, then the fault is determined to be an external fault. If and only if all activated devices 10, 11 and 12 indicate an internal fault, is the fault determined to be an internal fault. That is, one of the devices 10 and 12 may have a current signal that is below the set current level $I_{Sat}$, in which case the two remaining devices 11 and one of 10 and 12 are utilized in determining the fault direction. The device 11 arranged to determine the sum of the current transformers is thus always utilized in the determination.

By means of the above described protective device the direction of a fault can be determined even if one of the current transformers should get saturated. In such case the fault direction provided by the non-saturated current transformer is utilized. The protective relay in accordance with the invention requires slightly more processing power compared to the conventional use of only one directional element.

The above described invention is particularly suitable for use in distance protections in arrangements such as a breaker-and-a-half arrangement or a ring bus arrangement for handling CT saturation problems within such systems.

In summary, by means of the present invention problems due to saturation of current transformers are overcome. In accordance with the invention, the protective relay is able to handle even cases in which one of the current transformers indeed gets saturated. An improved fault direction determination is provided, thereby increasing the reliability of an electrical power distribution system. A fault direction can be determined with higher certainty and the fault can be located and attended to faster, thereby facilitating servicing and lowering the duration of a power failure.

In the preceding detailed description, the invention is described with reference to specific exemplary embodiments thereof. Various modifications and changes may be made thereto without departing from the scope of the invention as set forth in the claims. The specification and drawing are, accordingly, to be regarded in an illustrative rather than a restrictive sense.

The invention claimed is:

1. A protective relay for an electrical power distribution system comprising one or more power lines, said protective relay comprising:
    a first and a second current transformer arranged to sense a respective current flowing into a power line,
    a voltage sensing device arranged to sense a voltage of said power line,
    a first device for determining a direction of a fault within the system based on a current signal from said first current transformer and a voltage signal from said voltage sensing means,
    a second device for determining the direction of a fault within the system based on a current signal from said second current transformer and a voltage signal from said voltage sensing means,
    a third device for determining the direction of a fault within the system based on a sum of the current signals from said first and second current transformers and a voltage signal from said voltage sensing means, and
    controller means for determining whether a fault is internal or external based on the fault directions determined by said first, second and third devices.

2. The protective relay according to claim 1, wherein if one or more of said first, second and third devices indicates an external fault, then the fault is determined to be an external fault.

3. The protective relay according to claim 1, further comprising:
    means for setting a current level, wherein said first and second devices are arranged to be disregarded if the current signal in the respective device is below said set current level.

4. The protective relay according to claim 3, wherein said current level is set below a current level at which there is a risk of saturation of said current transformers.

5. The protective relay according to claim 3, wherein said current level is set to be higher than the maximum load current utilized.

6. The protective relay according to claim 1, wherein said first, second and third devices comprise directional elements.

7. The protective relay according to claim 1, further comprising:
    a plurality of circuit breakers.

8. The protective relay according to claim 7, further comprising:
    means for tripping a circuit breaker in response to a determined fault.

9. The protective relay according to claim 1, wherein said protective relay is utilized in a breaker-and-a half system.

10. An electrical power distribution system, comprising:
    one or more protective relays comprising a first and a second current transformer arranged to sense a respective current flowing into a power line, a voltage sensing device arranged to sense a voltage of said power line, a first device for determining a direction of a fault within the system based on a current signal from said first current transformer and a voltage signal from said voltage sensing means, a second device for determining the direction of a fault within the system based on a current signal from said second current transformer and a voltage signal from said voltage sensing means, a third device for determining the direction of a fault within the system based on a sum of the current signals from said first and second current transformers and a voltage signal from said voltage sensing means, and controller means for determining whether a fault is internal or external based on the fault directions determined by said first, second and third devices.

11. A method in a protective relay of an electrical power distribution system comprising one or more power lines, said protective relay comprising a first and a second current transformer arranged to sense a respective current flowing into a power line, and a voltage sensing means arranged to sense the voltage of said power line, the method comprising:

determining, in a first device, a direction of a fault within the system based on a current signal from said first current transformer and a voltage signal from said voltage sensing means, determining, in a second device, the direction of a fault within the system based on a current signal from said second current transformer and a voltage signal from said voltage sensing means, determining, in a third device, the direction of a fault within the system based on a sum of current signals from said first and second current transformers and a voltage signal from said voltage sensing means, and determining, in controller means, whether a fault is internal or external based on the fault directions determined by said first, second and/or third devices.

12. The method as according to claim 11, wherein if one or more of said first, second and third devices indicates an external fault, then the fault is determined to be an external fault.

13. The method as according to claim 11, further comprising:

setting a current level, wherein said first and second devices are disconnected if the current signal in the respective device is below said set current level.

14. The method as according to claim 13, wherein said current level is set below a current level at which there is a risk of saturation of one of said current transformers.

15. The method as according to claim 13, wherein said current level is set to be higher than the maximum load current.

16. The method as according to claim 11, wherein said first, second and third devices comprise directional elements.

17. The method as according to claim 11, wherein said protective relay further comprises a number of circuit breakers.

18. The method as according to claim 17, wherein said protective relay trips a circuit breaker in response to a determined fault.

* * * * *